Aug. 29, 1972 J. R. GRAND III 3,687,787
ULTRASONIC SPLICING APPARATUS
Filed Oct. 20, 1970 3 Sheets-Sheet 1

INVENTOR
JOHN RICHARD GRAND, III
BY Howard P. West Jr.
ATTORNEY

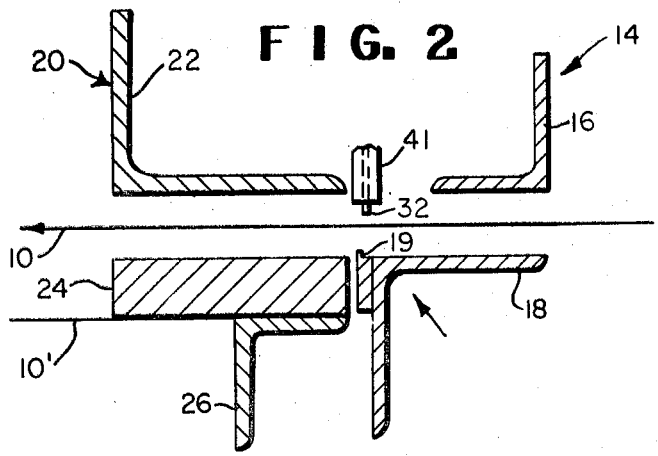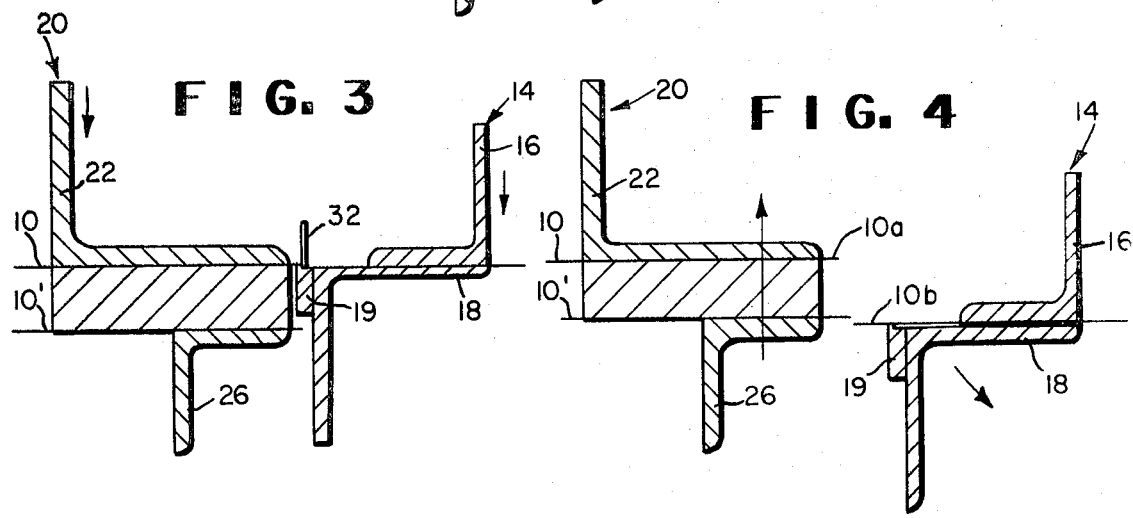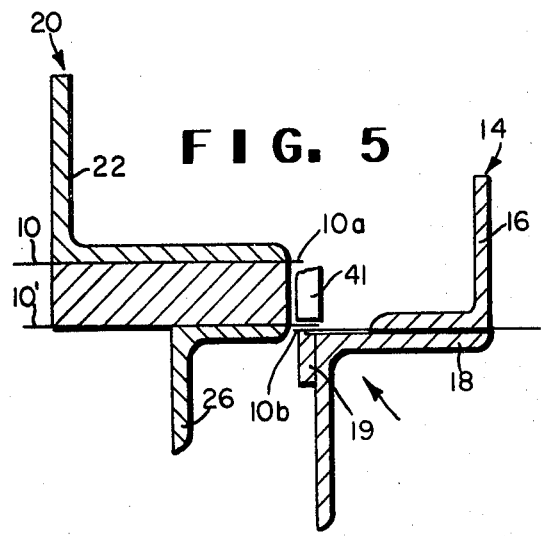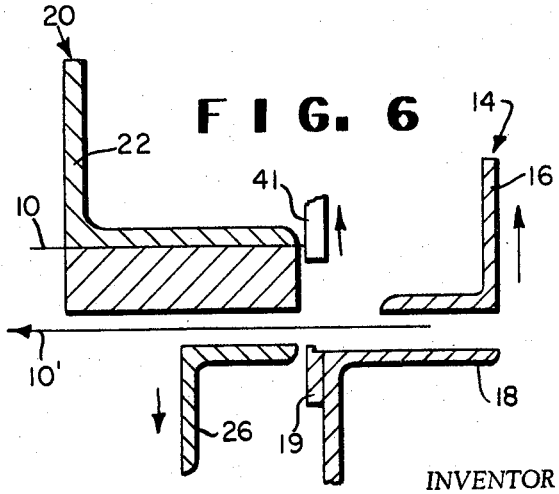

United States Patent Office 3,687,787
Patented Aug. 29, 1972

---

3,687,787
ULTRASONIC SPLICING APPARATUS
John Richard Grand III, Hermitage, Tenn., assignor to E. I. du Pont de Nemours and Company, Wilmington, Del.
Filed Oct. 20, 1970, Ser. No. 82,230
Int. Cl. B65h 21/00
U.S. Cl. 156—507    1 Claim

ABSTRACT OF THE DISCLOSURE

An apparatus of the type of advancing a thermoplastic sheet material from a source alternately over a number of paths to separate processing stations is modified to include a means for clamping, cutting, positioning and joining cut ends of the material for alternate advancement. The cutting and splicing mechanism comprises a first clamping means associated with each of the paths for clamping sheet material, a second clamping means positioned between the source of supply for the sheet material and the first clamping means and a cutting device associated with an ultrasonic welder positioned between the first and second clamping means. The controlled sequence of operation permits the cutting, overlapping, positioning and joining of adjacent ply ends of material to proceed automatically.

BACKGROUND OF THE INVENTION

The present invention generally relates to a winding apparatus for plies or webs of sheet material and, more particularly, it relates to novel improvements in means for cutting and splicing the sheet material in a controlled manner to automatically provide for delivery of the sheet material alternately to separate stations.

In the manufacture of sheet materials, it is frequently desirable to remove sections of defective sheet material as it advances from a source to a processing station by diverting the defective portion to a waste station and then after removal of the defective portion, rediverting to the processing station. Normally, this diverting includes existing known manual steps of clamping the sheet material, cutting it, then positioning and splicing the sheet material to a ply end leading to either the packaging or waste station.

In a sheet processing apparatus it is important to provide a quick and effective mechanism for removal of defective sections of sheet material then splice the good sections back together for further processing. The mechanism must be able to sequentially cut, change the line of distribution of the sheet material to different stations and then splice the sheet material. The present invention fulfills this need.

SUMMARY OF THE INVENTION

In an apparatus of the type wherein an advancing, elongated thermoplastic-sheet material is to be delivered from a source alternately over a number of paths to separate processing stations, there is provided a cutting and splicing mechanism for automatic alternate advancement to such stations. The mechanism comprises: a first clamping means associated with each one of the paths for clamping the sheet material, a second clamping means positioned in one of said paths between the source of the sheet material and the first clamping means, a cutting device positioned between the first and second clamping means for cutting the sheet material into separate plies when the material is clamped, means for moving the first and second clamping means relative to each other between positions where the clamp is in alignment with different ones of said paths and where the cut end of a ply of sheet material carried by the first clamping means overlaps the cut end of a ply in the second clamping means and means for joining overlapping ply ends.

The joining means is an ultrasonic welder movable into and out of a welding relation on the opposite side of the overlapped ply ends from a grooved anvil. Means are also provided for moving the welder in a path over the over-lapped ends to splice the ends together by ultrasonic energy. The grooved anvil provides space for excess material and prevents folding over the sheet material during the splicing or welding as the ultrasonic welder traverses the material. The grooves may be either aligned or angularly disposed with respect to the longitudinal axis of the sheet material. There is also provided a means for lifting said sheet material from the anvil after the splicing operation and coincident with the release of the second clamping means.

BRIEF DESCRIPTION OF THE DRAWINGS

FIGS. 2–6 schematically illustrate the sequence of cutting, positioning and joining for alternate movement between two stations.

DETAILED DESCRIPTION OF THE ILLUSTRATED EMBODIMENT

Figure 1:
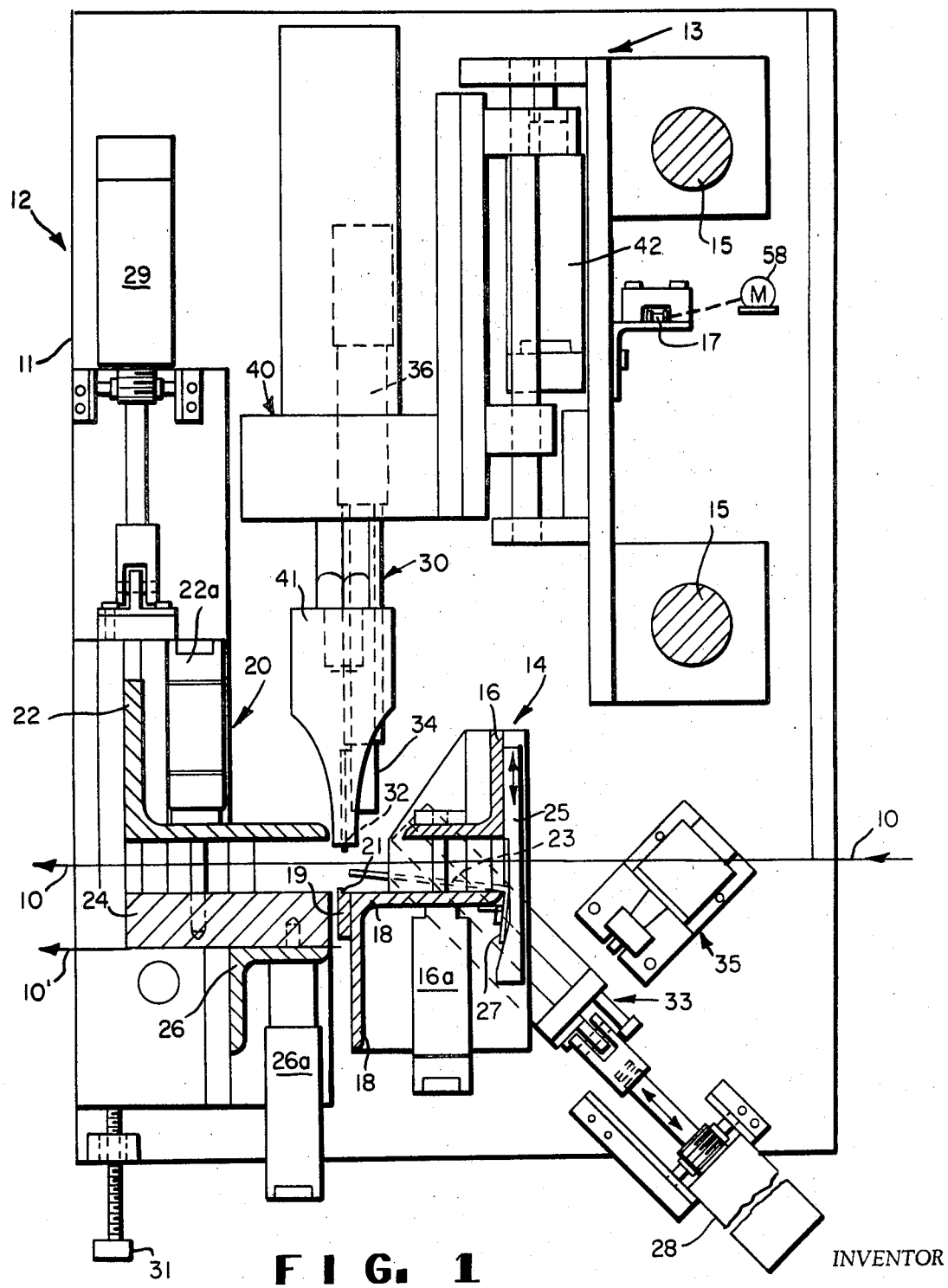
FIG. 1 is a partially sectioned elevation of the apparatus of this invention particularly illustrating the clamping, cutting and splicing means.

Referring to the drawings and, in particular, to FIG. 1, a thermoplastic sheet material such as web 10 is advancing continuously from right to left from a source (not shown) through cutting and splicing mechanism 12 to a package winding station. When attached to web ply 10', clamped in mechanism 12, the web is advanced to a waste winding station.

Clamp 14 comprised of cooperating clamp members 16, 18 and clamp 20 comprised of cooperating clamp members 22, 24, 26 are mounted to frame 11 for relative movement with respect to the frame. Clamps 14 and 20 are moved as units in directions to be described later by respective air cylinders 28, 29 coupled between the frame and the clamps. Individual clamp members 16, 22, 26 are moved into and out of clamping engagement by respective air cylinders 16a, 22a, 26a attached between frame 11 and the clamp members. Anvil 19 having a grooved upper surface 21 is attached to clamp member 18.

A cutter mechanism 30 and an ultrasonic transducer 40 are attached to carriage 13 which is mounted to shafts 15 for movement across the width of sheet material 10. The shafts 15 are attached to frame 11 and the carriage is moved by chain 17 attached to the carriage which, in turn, is driven by a reversing gear motor 58. The cutter mechanism comprises knife blade 32, attached to shaft 34 which, in turn, is connected to air cylinder 36 attached to carriage 13. The air cylinder moves the blade 32 into and out of engagement with web 10.

Similarly, transducer 40 is mounted to carriage 13 for movement across and into and out of engagement with the sheet material 10 in opposition to anvil 19. Air cylinder 42 coupled between the carriage and the transducer provides the motive means for such engagement with the sheet material, that is, tool tip 41 is lowered under pressure onto anvil 19 with overlapped plies of sheet material in between. The combination of vibration (e.g., 20,000 Hz.) and pressure joins the plies together.

The shape of the anvil is important as it determines the shape and area of the fused sections which, in turn, have a bearing on the strength of the seam. The grooved surface 21 of anvil 19 not only determines the shape of the fused or joined section but also provides space for excess material and prevents the sheet material from folding over as the vibrating tip 41 traverses across. The grooves may be aligned with or angularly disposed with respect to the longitudinal axis of the sheet 10.

In some instances, depending on the material used, there may be a tendency for the material to stick to the anvil after it is fused. To overcome this, a plate 23, hinged to clamp member 18 is pivoted upwardly against web 10 when clamp 14 is opened by means of the camming action of cam 25 attached to clamp member 14 and riding on downwardly turned edge 27 of plate 23. An air cylinder 35 attached to frame 11 adjacent the linkage 33 coupling clamp 14 to cylinder 28, when actuated in timed sequence with cylinder 28, engages the linkage to limit the upward travel of clamp 14.

The operation of the apparatus is shown schematically in FIGS. 2–6, wherein a sheet material is being advanced to a winding station through cutting and splicing mechanism 12 and a defective portion of that sheet material is to be diverted to a waste winding station (FIG. 2). The advancing web 10 is first stopped and the cutting and splicing function is initiated with the following sequence of events. Clamp 14 is moved upward and to the left by means of air cylinder 28, then clamp member 16 is lowered and clamps the web 10 between clamp members 16, 18. At the same time, clamp member 22 is lowered and clamps the web 10 between clamp members 22, 24. A ply end of web 10' leading to a waste windup (not shown) is clamped between clamp member 24, 26. The knife blade 32 is lowered against web 10 and is traversed across web 10 cutting it into two separate plies 10a, 10b (FIG. 3). Clamp 14 then is moved down and to the right to allow clamp 20 to move upward without the two ply ends 10a and 10b touching and interfering (FIG. 4). The upward movement of clamp 20, limited by stop 31, is such that the ply end 10' going to the waste windup is slightly above ply end 10b. Clamp 14 then moves up and to the right causing ply ends 10' and 10b to overlap and the transducer tip 41 is lowered into position and traversed across the overlapped ends, thus joining the web (FIG. 5). Next, the clamp members 16 and 26 are released and the splicing operation stops. The web is then wound to waste until the defect is removed (FIG. 6). Following this, the cutting-splicing mechanism is again activated to splice the web onto ply end 10a for advancement to the winding station.

Figure 7:
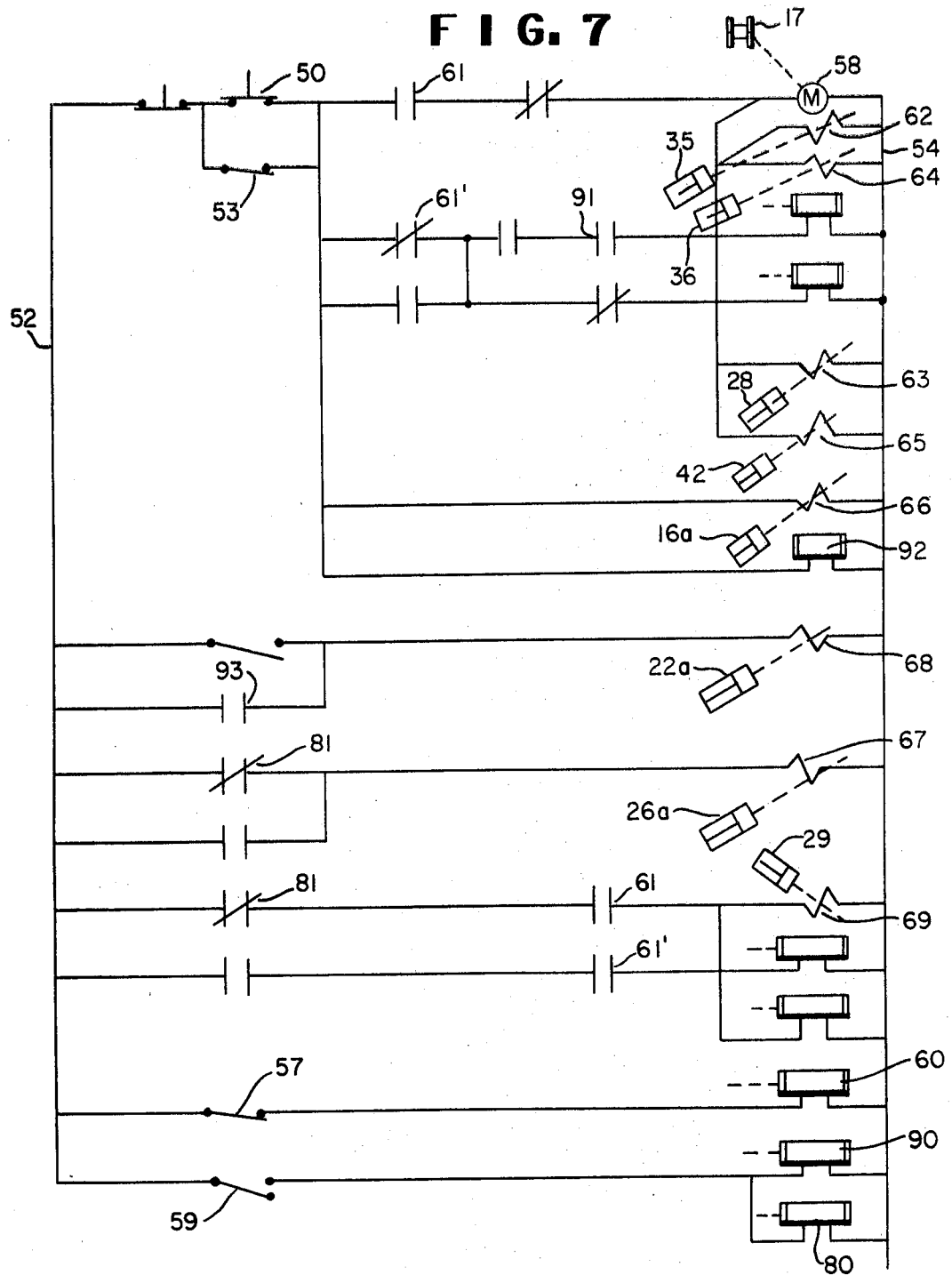
FIG. 7 is a schematic diagram of the circuit for controlling movements of the cutting and splicing mechanism.

The operation of the cutting and splicing mechanism 12 is initiated, after the web travel has been stopped, by closing switch 50 in the control circuit of FIG. 7 which includes leads 52, 54 connected to a source of electrical power (not shown). Limit switch 53, is held open by carriage 13 when it is in the rest position before the start of a cutting cycle. Limit switch 57 is closed energizing relay 60, closing contacts 61 and opening contacts 61'. By closing switch 50, the motor 58 is energized along with solenoids 62, 63, 64, 66, 68 and relay 92 which closes contacts 93. Motor 58 moves carriage 13 away from switch 53, causing it to close which holds in the starting circuit. Solenoids 62, 64, 66, 68 lower knife blade 32, clamp web 10 between clamps 14, 20 and operate the air cylinder 35 to limit the travel of clamp 14.

Knife 32 is carried across the web cutting it into separate plies 10a, 10b. At the end of the cutting stroke the carriage 13 operates switch 57 de-energizing relay 60. This causes cylinder 29 to move clamp 20 up operating switch 59 which energizes relays 80, 90 and their respective associated contacts 81, 91 which, in turn, activate solenoids 63, 65, 69 to shift clamp 14, lower transducer 40 and reverse motor 58. Solenoid 67 is also held in to maintain position of clamp 26. The carriage then moves back across the overlapped ends 10' and 10b splicing the web. When the carriage returns to the rest position, switch 53 is opened de-energizing solenoids 66, 68 releasing clamps 14 and 26. In an actual embodiment, all of the functional events described in connection with the cutting and splicing mechanism occur within a relatively short period of time.

It is apparent that many modifications of the disclosed mechanism may be made without departing from the spirit of the present invention which is accordingly intended to be limited by the scope of the appended claims.

What is claimed is:

1. In an apparatus of the type wherein an advancing, elongated thermoplastic sheet material is to be delivered from a source alternately over a number of paths to separate processing stations, a cutting and splicing mechanism which comprises: a first clamping means associated with each of said paths for clamping sheet material passing in each path; a second clamping means positioned in one of said paths between said source and said first clamping means; a cutting device positioned between said first and second clamping means for cutting said sheet material into separate plies when said material is clamped between the first and second clamping means; means for moving said first and second clamping means between positions where the second clamping means is in alignment with different ones of said paths and where the end of a ply carried by the first clamping means overlaps the end of a ply in said second clamping means; an ultrasonic welder; an anvil supporting the overlapped ply ends; means for moving said welder into and out of a welding relation with the overlapped ply ends; means for moving said welder in a path over the overlapped ply ends to splice the ends together by ultrasonic energy; and means associated with said second clamping means for lifting said sheet material from the anvil when said second clamping means is opened.

References Cited

UNITED STATES PATENTS

| 3,102,189 | 8/1963 | Jones et al. | 219—82 |
| 3,166,266 | 1/1965 | Erskine | 242—58.1 |
| 3,270,180 | 8/1966 | Morley et al. | 228—6.5 X |
| 3,361,318 | 1/1968 | Nowisch | 228—1 |

ROBERT F. BURNETT, Primary Examiner

J. C. GIL, Assistant Examiner

U.S. Cl. X.R.

156—73, 502, 510, 512, 543, 519, 580; 228—1; 242—58.1